United States Patent
Dawson (10) Patent No.: US 8,302,202 B2
(45) Date of Patent: Oct. 30, 2012

(54) TRANSPORTABLE COMPUTING ENVIRONMENT APPARATUS SYSTEM AND METHOD

(75) Inventor: Colin Scott Dawson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1619 days.

(21) Appl. No.: 11/196,164

(22) Filed: Aug. 3, 2005

(65) Prior Publication Data

US 2007/0033655 A1 Feb. 8, 2007

(51) Int. Cl.
*H04L 29/06* (2006.01)

(52) U.S. Cl. ............... 726/27; 726/26; 713/186; 705/50

(58) Field of Classification Search ............. 726/26–30; 713/186; 705/50, 59
See application file for complete search history.

(56) References Cited

U.S. PATENT DOCUMENTS

| | | | |
|---|---|---|---|
| 6,078,913 A | 6/2000 | Aoki et al. | 707/2 |
| 6,754,470 B2 * | 6/2004 | Hendrickson et al. | 455/67.11 |
| 6,915,278 B1 * | 7/2005 | Ferrante et al. | 705/59 |
| 7,055,026 B2 * | 5/2006 | Gere | 713/100 |
| 7,441,108 B2 * | 10/2008 | Fisher et al. | 712/227 |
| 7,540,024 B2 * | 5/2009 | Phillips et al. | 726/20 |
| 2002/0147912 A1 * | 10/2002 | Shmueli et al. | 713/182 |
| 2003/0074660 A1 | 4/2003 | McCormack et al. | 725/2 |
| 2004/0001088 A1 | 1/2004 | Stancil et al. | 345/748 |
| 2004/0019778 A1 | 1/2004 | Gere | 713/2 |
| 2005/0154885 A1 * | 7/2005 | Viscomi et al. | 713/165 |

* cited by examiner

*Primary Examiner* — Kim Vu
*Assistant Examiner* — Randal Moran
(74) *Attorney, Agent, or Firm* — Kunzler Law Group, PC.

(57) ABSTRACT

An apparatus, system, and method are disclosed that provides a user-specific transportable computing environment. The apparatus, system, and method facilitate users configuring their own personal computing environment on a properly configured computing host. Users can insert a personal environment key into the computing host and automatically activate and configure any software they are licensed to use. The personal environment key may include all the data, licenses, and keys necessary to activate software that the user has rights to use.

19 Claims, 6 Drawing Sheets

TRANSPORTABLE COMPUTING ENVIRONMENT APPARATUS SYSTEM AND METHOD

BACKGROUND OF THE INVENTION

1. Field of the Invention

This invention relates generally to means and methods for configuring computing devices and more particularly relates to apparatus, systems, and methods for providing a user-specific transportable computing environment.

2. Description of the Related Art

Computing is becoming evermore pervasive. Transactions that used to be only conducted in person can be conducted through computers and networks associated therewith. Many professions have been made easier with the use of a computer. In addition, more and more people carry their work with them whenever they travel via portable computing devices. However, many users have multiple computing devices dedicated to specific purposes. Some of these computing devices are bulky and can be uncomfortable to carry. Often, users are required to juggle the various computing devices they own, thus offsetting the original convenience promised by such devices.

Some users try to use much smaller computing devices, such as PDAs (Portable Digital Assistants) to fill their portable computing needs. However, many software applications are not available on small computing devices. In addition, because data entry is typically more difficult on a small computing device, users often prefer traditional laptops or desktops for many common tasks.

Figure 1:
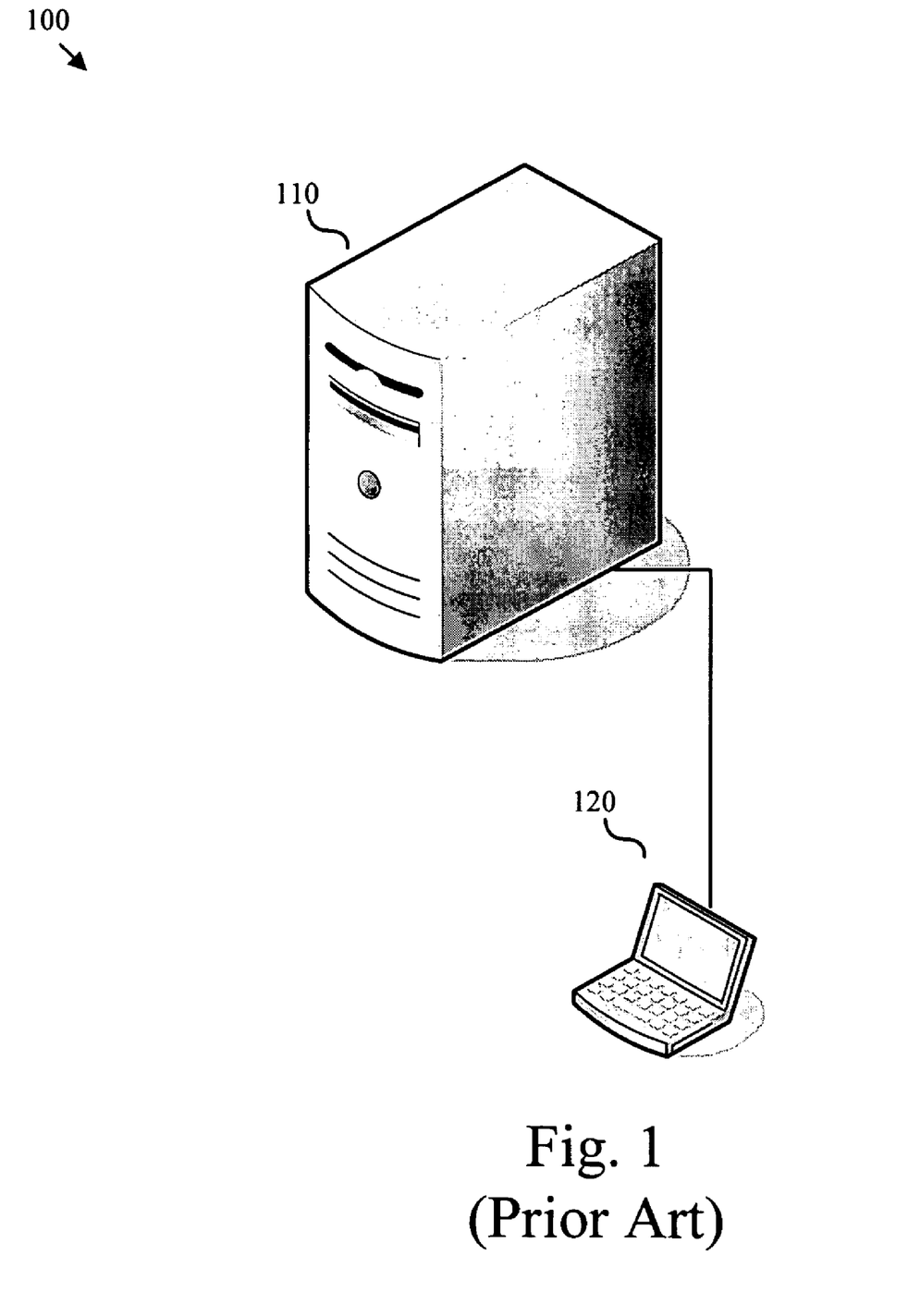
FIG. 1 is a block diagram depicting one embodiment of a prior art computing environment configuration system.

FIG. 1 is a block diagram of the current art attempting to fill people's requirements for portable computing. FIG. 1 depicts a centralized server 110 connected to a portable computing device 120, such as a notebook computer. In certain environments, users may download a pre-configured boot image including computing applications from a centralized server 110 to a portable computing device 120. Consequently, in some cases users are able to configure the computing device 120 to reflect their needs and preferences. Users can then carry their portable computing device 120 with them wherever they go.

One disadvantage of the current art, however, is that the pre-configured boot image is typically restricted to devices that have a particular processor and operating system as well as some capability to operate as a desktop. Making changes to the selected applications does not result in corresponding changes to the boot image. Furthermore, the portable computing device is typically bulky and cannot be carried in a pocket or handbag. In addition, portable computing devices are frequently stolen.

From the foregoing discussion, it should be apparent that a need exists for an apparatus, system and method for a transportable computing environment. Beneficially, such an apparatus, system and method would enable users to configure their personal computing environment on any accessible computing device.

SUMMARY OF THE INVENTION

The present invention has been developed in response to the present state of the art, and in particular, in response to the problems and needs in the art that have not yet been fully solved by currently available methods of providing users with a transportable computing environment. Accordingly, the present invention has been developed to provide an apparatus, system, and method for providing a transportable computing environment that overcomes many or all of the above-discussed shortcomings in the art.

In one aspect of the present invention, a computing host may be configured to access a personal environment key that includes information about a personal computing environment. The computing host may include an available software registry. The available software registry may contain information about software products available for use on the computing host.

The computing host may also include a host setup module for authenticating users, synchronizing data files, modifying software on the computing host, and downloading, registering, and activating user software. In addition, the host setup module may also deactivate the software and resynchronize the data files when the user session terminates.

In another aspect of the present invention, a personal environment key may include a software registry stored on non-volatile memory. The software registry may include information about software one or more users are licensed to use. The software registry may also include information about user preferences for the software products. In addition, the personal environment key may also include an authentication module containing information sufficient to verify the user.

In some embodiments, the authentication module includes a biometric sensor configured to provide biometric information. In certain embodiments, the authentication module includes a portion of the non-volatile memory containing authentication information, such as user names and passwords. In addition, the personal environment key may also contain a data files module that contains the data files or references to data files associated with a user.

In another aspect of the present invention, a method for providing a transportable computing environment includes operations to authenticate a user of the personal environment key, access a software registry stored on the personal environment key and activate the software products licensed to the authenticated user.

In addition, the method for providing a transportable computing environment may synchronize data files that correspond to the activated software. In additional embodiments, the method for providing a transportable computing environment may also modify the licensed software to match the user's personal settings, download any additional software the user requests, and deactivate the software after the computing session terminates.

The present invention offers distinct advantages over the prior art. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention. The present invention enables users to easily carry their personal computing environment with them. The apparatus, system and method for a transportable computing environment facilitate configuring a user's personal computing environment on any computing device, independent of the processor and operating system.

These and other features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of embodiments of the invention. The described features, structures, or characteristics of the invention may be combined in any suitable manner in one or more embodiments. Furthermore, one skilled in the relevant art will recognize that the invention can be practiced without one or more of the specific details, or with other methods, components, materials, and so forth. In other instances, well-known structures, materials, or operations are not shown or described in detail to avoid obscuring aspects of the invention.

Figure 2:
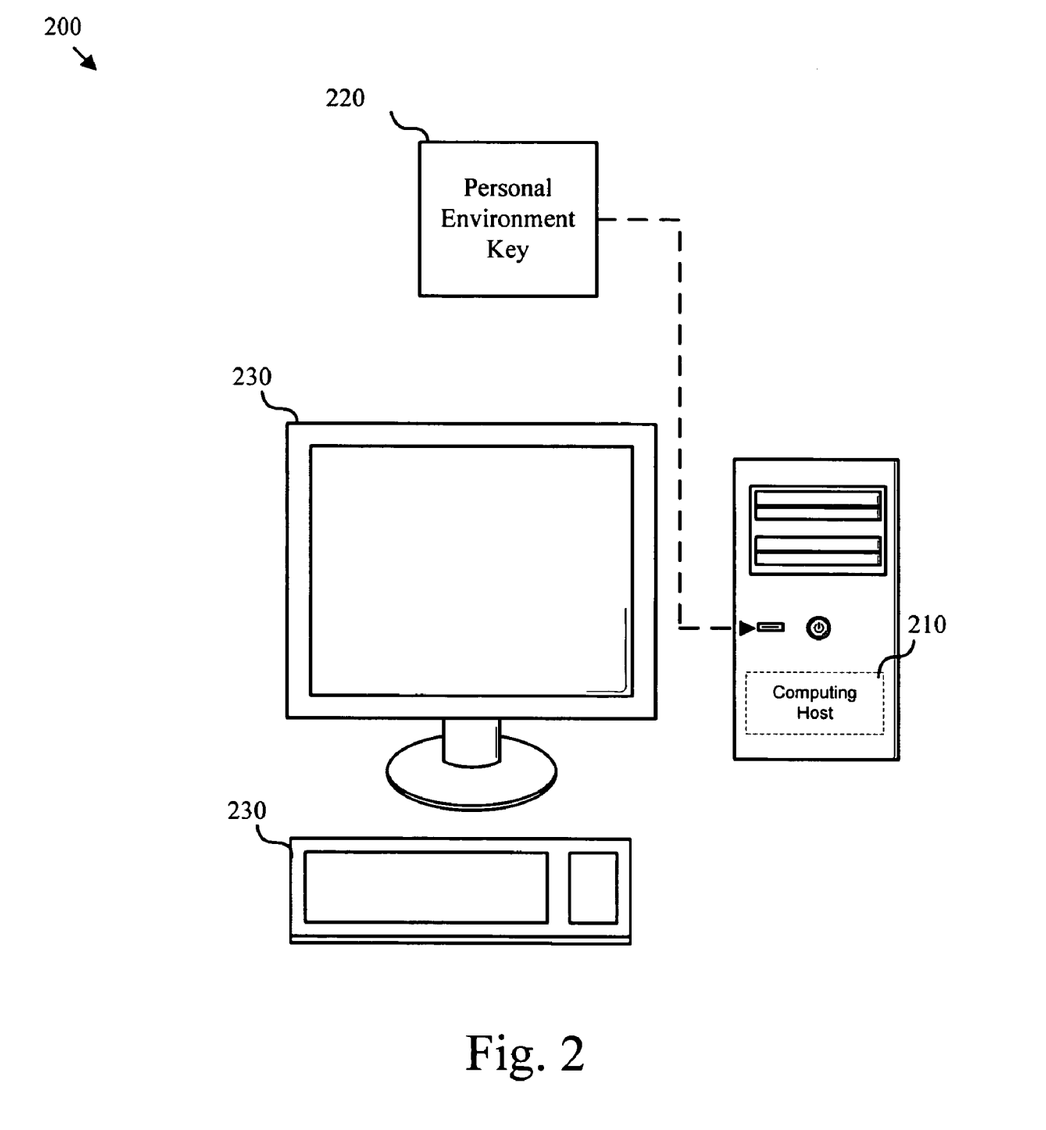
FIG. 2 is a block diagram depicting one embodiment of a transportable computing system in accordance with the present invention.

FIG. 2 is a block diagram of one embodiment of a transportable computing system 200 of the present invention. As depicted, the transportable computing system 200 includes a computing host 210, a personal environment key 220, and one or more peripheral devices 230. The transportable computing system 200 facilitates convenient transportation of a user's computing environment to computing hosts located anywhere. Thus, users are able to access the software and information they need to conduct work or personal business without carrying an actual computing device with them. In addition, the transportable computing system 200 enables efficient and reliable configuration of a remote computing environment.

As depicted in FIG. 2, the computing host 210 may be any properly configured computing host. For example, the computing host 210 may be a commoditized computing access point available in public areas such as airports. In certain embodiments, the computing host 210 is configured with a variety of software applications that are available to be temporarily licensed, activated, and used.

The embodiment of the transportable computing system 200 depicted in FIG. 2 uses a personal environment key 220 that plugs into a port located on the computing host 210. The personal environment key 220 may be any device comprising non-volatile memory. The personal environment key 220 is preferably packaged in a small form factor. Examples of such devices could be, but are not limited to, cell phones, memory keys, and portable digital assistants. In an additional embodiment, the personal environment key 220 automatically connects to the host via wireless technology thus eliminating the need to be directly attached to the computing host 210.

In certain embodiments, the personal environment key 220 may store records that contain information such as license keys, passwords, software identifiers, product codes and manufacture codes useful for activating software residing on the computing host 210. The personal environment key 220 may also contain user settings and the data files necessary for the user to access and operate the software. In some embodiments, the personal environment key 220 may contain the software executables and data necessary to activate the user's computing environment on the computing host 210. The personal environment key 220 may contain authentication information useful for authenticating users.

The computing host 210 includes the software and hardware necessary to access the personal environment key 220. In certain embodiments, the computing host 210 includes a device driver that manages access to the personal environment key 220. In additional embodiments, the computing host 210 may contain modules that interact with the modules on the environment control key 220 to activate the software the user desires to use and to synchronize any data files necessary to operate the software.

As depicted in FIG. 2, the transportable computing system 200 also includes one or more peripheral devices 230. The peripheral devices 230, such as keyboards, monitors and printers, initiate and enable access between the computing host 210 and the personal environment key 220.

In some embodiments, the transportable computing system 200 can be used to simplify workstation recovery. Once the appropriate software applications are re-installed, users can use the personal environment key 220 to reconfigure the workstation and restore their familiar computing environment, settings and data files.

Figure 3:
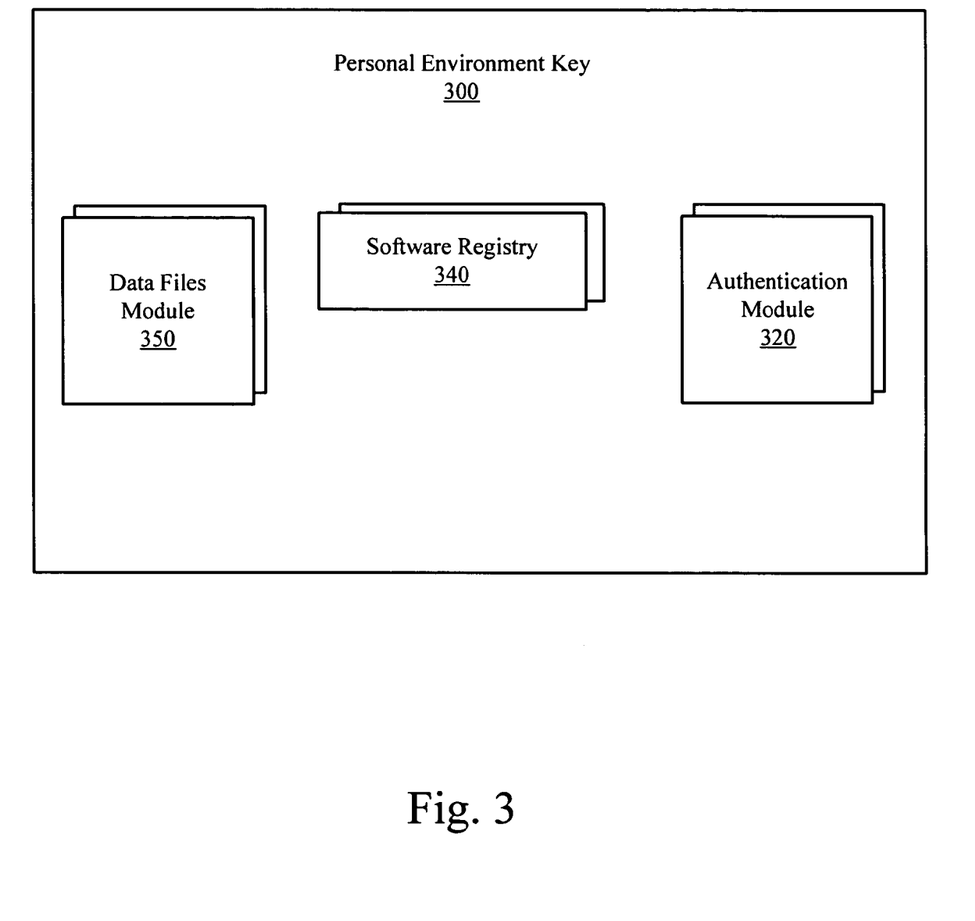
FIG. 3 is a block diagram depicting one embodiment of a personal environment key in accordance with the present invention.

FIG. 3 is a block diagram depicting one embodiment of a personal environment key 300 in accordance with the present invention. As depicted, the personal environment key 300 includes an authentication module 320, a software registry 340, and a data files module 350. The personal environment key 300 is one example of the personal environment key 220 depicted in FIG. 2.

The depicted personal environment key 300 contains the information necessary to recreate a user's personal computing environment on the computing host 210 (FIG. 2) or the like. Beneficially, the personal environment key 300 contains all the information necessary to enable users to continue their work at any location with an available computing host without the requirement of actually transporting a computing device with them.

The depicted personal environment key 300 may include an authentication module 320. In one embodiment, the authentication module 320 ensures that only authorized persons can access the personal environment key 300. The authentication module 320 may require a secure login with an authorized password or the like to verify authorized use. In one embodiment, biometric information is verified before the user is authenticated. In some embodiments, the authentication module 320 is used in conjunction with a standard login dialog associated with the operating system on the computing host.

In certain embodiments, the authentication module 320 is essentially a dedicated region of memory containing information that enables authentication. This information may be encrypted and match or correlate information provided by other means such as a bar code or biometric sensor. For example, a bar code could be located on the exterior of the personal environment key 300 and usage of the personal environment key 300 could require the bar code scan to match encrypted information contained in the authentication module 320. Providing both physical and electronic sources of authentication information reduces the likelihood of tampering.

The personal environment key 300 may include a software registry 340. The software registry 340 may contain information useful for activating software for use on the computing host 210. For example, the information stored in the software registry 340 may include registration information, license keys, passwords, and set-up information, and the like. In certain embodiments, the software registry 340 also contains the information necessary to download the required software (such as a URL address, username and password) if it is not present on the computing host 210.

The data files module 350 may contain data files or reference data files useful for configuring and using the software. In further embodiments, the data files module 350 may also include working files such as spread sheets and word-processing documents. In certain embodiments, the data files module 350 is configured to synchronize these data files with the data files on the computing host 210 so that the user's data files are always up to date.

In other embodiments, users may purchase a personal environment key 300. For example, a purchased personal environment key 300 may contain the necessary licensing and setup information to allow users to temporarily license one or more software applications for a specified period of time.

Figure 4:
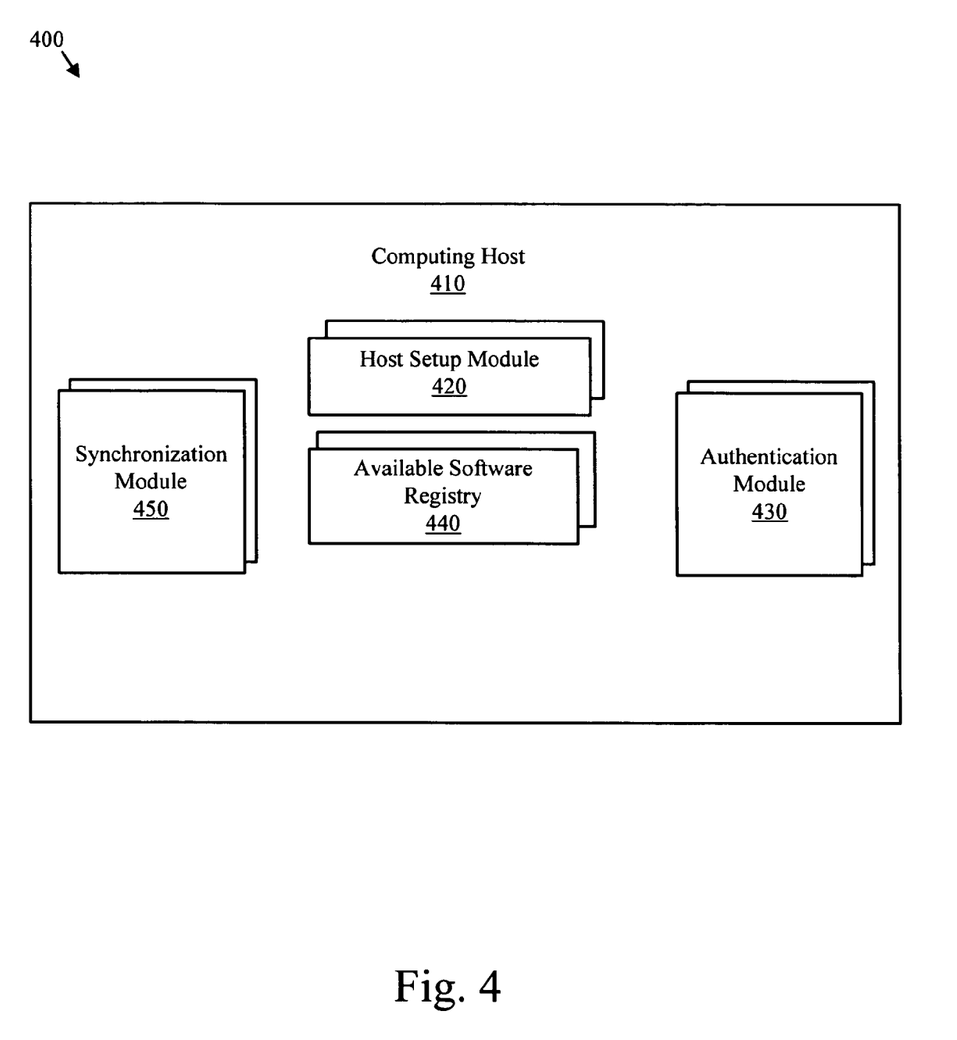
FIG. 4 is a block diagram depicting one embodiment of a personal environment key in accordance with the present invention.

FIG. 4 is a block diagram one embodiment of a computing host 410 in accordance with the present invention. As depicted, the computing host 410 may include a host setup module 420, an authentication module 430, an available software registry 440, and a synchronization module 450. Beneficially, the computing host 410 enables users to configure their personal computing environment and may be a publicly accessible host or a host situated in a secure limited-access area.

The depicted computing host 410 includes a host setup module 420. The host setup module 420 may interact with a personal environment key such as the personal environment key 300 to configure the user's environment on the computing host 210. In certain embodiments, the host setup module 420 may present a user interface to assist users in configuring their computing environments.

In certain embodiments, the host setup module 420 may offer users the option to save their computing environment on the computing host. If the user chooses to save the computing environment, the host setup module 420 may save the current configuration parameters including which applications are executing previous to deactivating the computing environment. After the user logs in again, the host setup module 420 may reactivate the user's computing environment, so that the user can access the software applications and data files without reconfiguring the computing host 410 via a personal environment key 300 or the like.

The computing host 410 may also contain an authentication module 430. The authentication module 430 may interact with the authentication module 320 on the personal environment key 300 to ensure that only authorized persons can access the personal environment key 300. In certain embodiments, the authentication module 430 may require an authorized password. The authentication module 430 may compare this authentication information with the authentication information stored in the authentication module 320 to verify the authorized user. In some embodiments, the authentication module 430 may include a biometric sensor independent of any biometric sensor on the personal environment key 300.

In one embodiment, biometric information provided by a biometric sensor (accessible to the host or the personal key 300) is verified before the user is authenticated. In other embodiments, the authentication module 430 may verify information received from a peripheral such as a barcode scanner with information contained in the personal environment key's 300 authentication module 320.

As illustrated in FIG. 4, the computing host 410 may also contain an available software registry 440. The available software registry 440 may contain the information necessary to license and activate the software stored on the computing host 210 (FIG. 2). In certain embodiments, the host setup module 420 downloads the appropriate setup information, user preferences, software keys and license information from the software registry 340 located on the personal environment key 300 to the available software registry 440 located on the computing host 410.

As illustrated in FIG. 4, the synchronization module 450 may synchronize the information stored in the data files module 350 on the personal environment key 300. This information may include the data and files required to run the software in the manner preferred by the user. By synchronizing the data in the data files module 350, the synchronization module 450 keeps the user's data files stored in the data files module 350 up to date.

The schematic flow chart diagrams that follow are generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. For example, the order in which a particular method occurs may or may not strictly adhere to the order of the corresponding steps shown.

Figure 5:
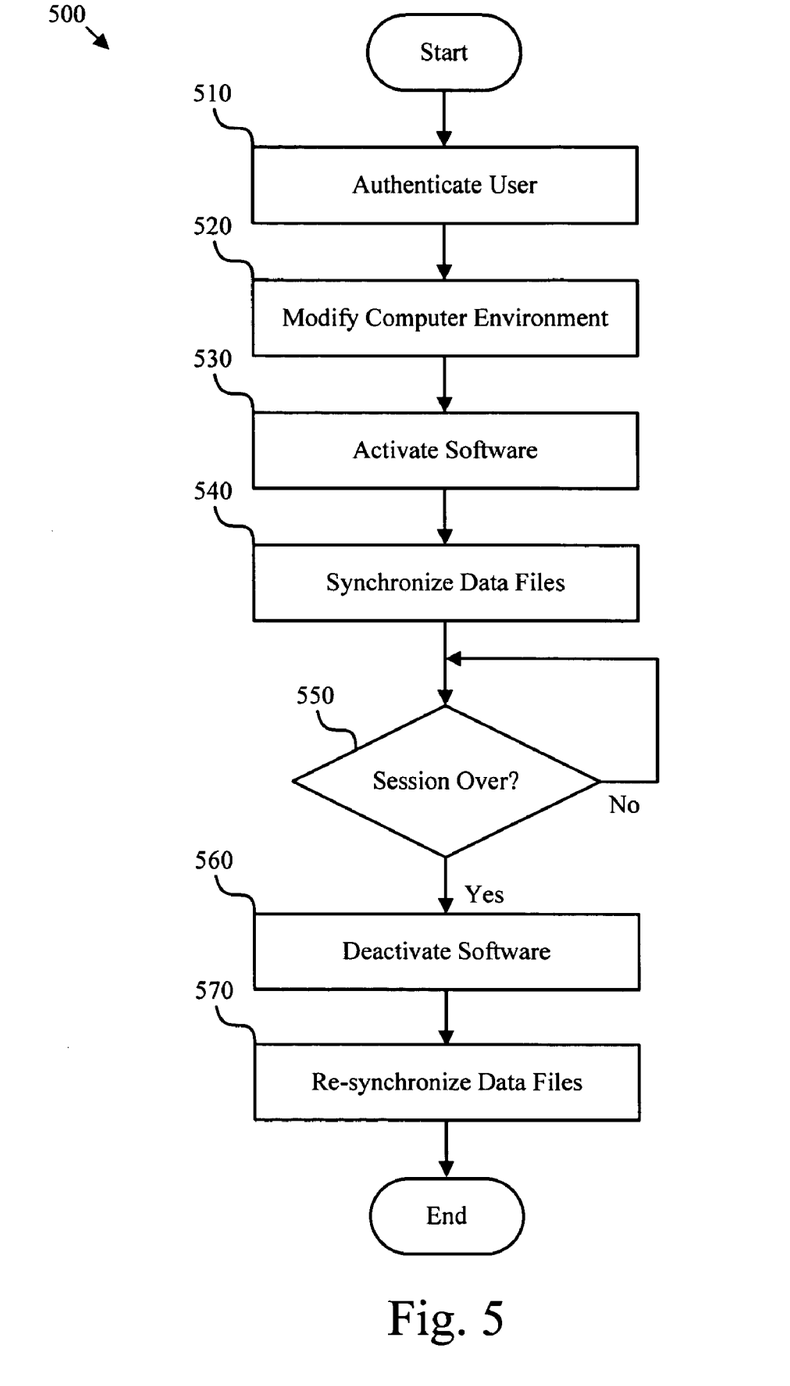
FIG. 5 is a flow chart diagram depicting one embodiment of a transportable computing method in accordance with the present invention.

FIG. 5 is a flow chart diagram depicting one embodiment of a transportable computing method 500 in accordance with the present invention. As depicted, the transportable computing method 500 includes an authenticate user operation 510, a modify computer environment operation 520, an activate software operation 530, a synchronize data files operation 540, a session over test 550, a deactivate software operation 560, and a resynchronize data files operation 570. Beneficially, the transportable computing environment method 500 enables users to easily set up any computing host with a computing environment that is familiar to them and that provides the software they need to perform their personal and professional computing functions.

In certain embodiments, the authentication modules 320 (FIG. 3) and 430 (FIG. 4) may authenticate 510 a user to ensure that the user has the appropriate password(s) or authentication information to access the information on the personal environment key 300. For example, the authentication module 430 may prompt the user for a password or other identifying information and then compare that information with the information stored in the authentication module 320 on the personal environment key 300. If the user's authentication information is correct, the transportable computing method 500 continues to the modify computer environment operation 520.

In additional embodiments, the host setup module 420 and the personal environment key 300 may interact to modify 520 the computer environment and enable users to set up their personal computing environment on any computing host 210 (FIG. 2). In one embodiment, the modify computer environment operation 520 displays a list of software available on the computing host 210. After the user selects the desired software, the modify computer environment operation 520 may access the software registries 340 and 440 to activate and/or temporarily license the software. In certain embodiments, the modify computer environment operation 520 may access the software registry 340 for information, such as download locations, regarding software the user would like to use but that is not contained on the computing host 210. The user may elect to download and activate this software on the computing host 210. Whenever a user activates software, the activate software operation 530 may add the activated software to a software control list. In additional embodiments, the activate software operation 530 may also add any software the user downloads to this control list.

Subsequent to activating the software with the appropriate information, the transportable computing method 500 may continue to the synchronize data files operation 540. In addition to requiring licenses and software keys, some software requires additional data files that might hold user preferences and user data. In some embodiments the synchronize data files operation 540 downloads or synchronizes the user data files from the user data files module 350 to the user data files module 450.

As illustrated in FIG. 5, after the transportable computing environment method 500 activates the user's computing environment, the user is able to freely use the computing host 210 until the user's session is over 550. After the user has ended the session, the transportable computing environment method 500 may proceed to the deactivate software operation 560.

The deactivate software operation 560 may prompt the user about removing software and associated information such as licenses, software keys, user preferences, temporary data files and the like from the computing host. Optionally, the user may elect to retain such information for future use. In certain embodiments, the deactivate software operation 560 may remove the software from a software control list. After the software has been de-activated, the transportable computing method 500 may proceed to the re-synchronize data files operation 570.

In addition to removing licenses and software keys, the re-synchronize data files operation 570 may synchronize any changes users have made to their user preferences and user data files back to the user data files module 350 on the personal environment key 300. In additional embodiments, the re-synchronize data file operation 570 may securely remove the user data files, including any files that store user preferences, from the computing host 210.

Figure 6:
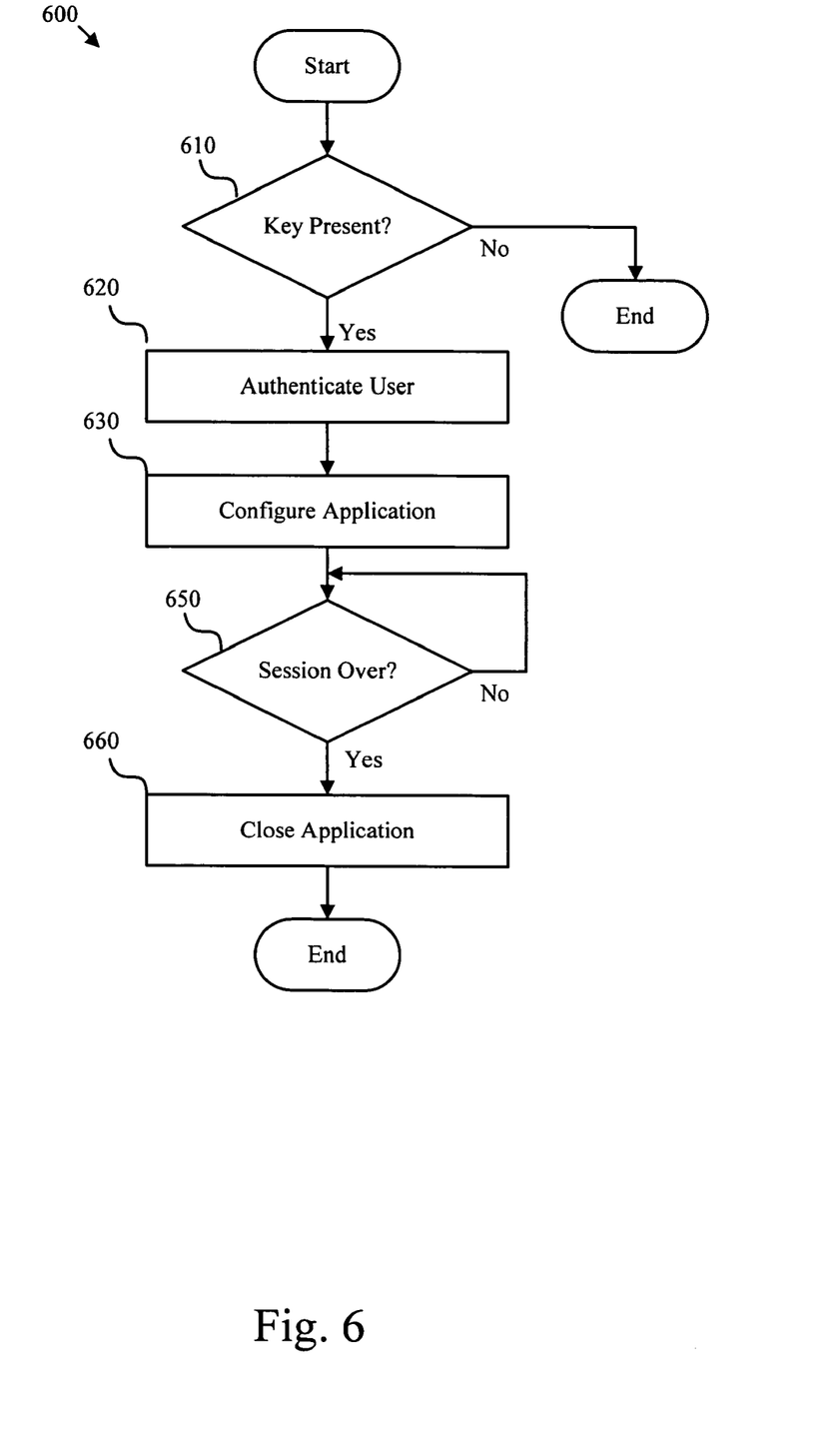
FIG. 6 is a flow chart diagram depicting one example of an embodiment of a runtime configurable software application.

FIG. 6 is a flow chart diagram depicting one example of an embodiment of a software configuration method 600 of the present invention. As depicted, the software configuration method 600 includes a key present test 610, an authenticate user operation 620, configure application operation 630, a session over test 650, and a close application operation 660. Beneficially, the software configuration method 600 enables a software program to be quickly configured with minimal user interaction. In one embodiment, the software configuration method 600 is conducted by a 'key aware' software program that configures itself according to preferences stored on a personal environment key 300 or the like.

The depicted method begins by testing 610 for the presence of a personal environment key 300. In some embodiments, if the personal environment key 300 is not present, the software configuration method 600 ends. In one embodiment, if the software configuration method 600 detects that the key is absent, the software application may continue to run in a limited or default configuration. If the key present test 610 detects that a personal environment key 300 is present, the software configuration method 600 continues to the authenticate user operation 620.

The authenticate 620 operation may verify that the user has the appropriate password(s), credentials, or other information that matches information on the personal environment key 300. If the user's authentication information is correct, the software configuration method 600 continues to the configure application operation 630.

The configure application operation 630 may include the necessary steps and operations to activate, set up, and configure the software application for use according to preferences stored on the personal environment key 300 or the like. In some embodiments, the configure application operation 630 may access information stored in the personal environment key's 300 software registry 340. The method may copy this information into a software registry stored on the computing host 210.

In additional embodiments, the configure application operation 630 may synchronize the data files necessary to use the software. In some embodiments, the configure application operation 630 downloads or synchronizes the user data files from the user data files module 350 to the computing host 210. In additional embodiments, the configure application operation 630 maintains a control list of settings and directories the user may have modified.

As illustrated in FIG. 6, subsequent to the configure application operation 630 the user is able to freely use the software application until the session over test 650 indicates that the user's session has terminated. If the user session is terminated, the software configuration method 600 closes 660 the software. In certain embodiments, the session over test 650 may detect the absence of the personal environment key. If the personal environment key is unexpectedly absent, the session over test 650 may detect that the user session is over and continue to the close application operation 660.

Subsequent to ending the software session, the software configuration method 600 may close 660 the application. To close the software application, the close application operation 660 may remove the license, software keys, user preferences and the like, from the available software registry 440. In certain embodiments, the close application operation 660 may remove any additional unlocking data from the software application itself. After the software has been de-activated and returned to its default state, the close software operation 660 may synchronize the data files back to the personal environment key 220.

In addition to removing licenses and software keys, close application operation 660 may synchronize any changes users have made to their user preferences and user data files back to the user data files on the personal environment key 300. In additional embodiments, the close application operation 660 may securely remove the user data files, including any files that store user preferences, from the computing host 210.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for providing a user-specific transportable computing environment, the system comprising:
    a portable memory device comprising non-volatile memory configured to store information, the information comprising a software registry configured to identify software products licensed to a user and storing a license key for each software product and information to recreate the user's personal computing environment from the information stored on the portable memory device; and
    a computing host configured to access the portable memory device, recreate the user's personal computing environment, activate a first software product using a license key of the first software product from the software registry when the first software product is present on the computing host and when the software registry stores the first software product license key, else download and activate the first software product using the first software product license key when the first software product is not present on the computing host and when the software registry stores the first software product license key, and synchronize only data files corresponding to the activated first software product.

2. The system of claim 1, wherein the portable memory device is further configured to store the data files corresponding to the activated first software products licensed to the user.

3. The system of claim 1, wherein the information further comprises authentication information.

4. The system of claim 3, wherein the computing host further comprises an authentication module configured to authenticate the user using the authentication information.

5. The system of claim 1, wherein the portable memory device further comprises a biometric sensor.

6. The system of claim 1, wherein the information further comprises user preferences.

7. The system of claim 1, the portable memory device comprising a barcode located on an exterior of the portable memory device and storing an encrypted password and encrypted bar code information, the portable memory device authenticating access to the portable memory device in response to receiving the password and the bar code information from a scan of the bar code, the computing host ending a user session, saving changes to the user's personal computing environment to the computing host, deactivating the first software product, and synchronizing the changes to the user's personal computing environment and user preferences to the portable memory device.

8. A memory device tangibly storing a program of machine readable instructions executed by a digital processing apparatus to perform operations to provide a user-specific transportable computing environment, the operations comprising:
    authenticating a user of a portable non-volatile memory device;
    accessing information stored on the portable non-volatile memory device, the information comprising a software registry identifying software products licensed to the user and comprising a license key for each software product, and information to recreate the user's personal computing environment from the information stored on the portable non-volatile memory device;
    recreating the user's personal computing environment on a computer;
    activating a first software product using a license key of the first software product from the software registry when the first software product is present on the computer and when the software registry stores the first software product license key else downloading and activating the first software product using the first software product license key when the first software product is not present on the computer and when the software registry stores the first software product license key; and
    synchronizing only data files corresponding to the activated first software product.

9. The memory device of claim 8, wherein the operations further comprise deactivating the activated first software product.

10. The memory device of claim 8, wherein activating the first software product further comprises modifying the first software product to match personal settings associated with the user.

11. The memory device of claim 8, the portable non-volatile memory device comprising a barcode located on an exterior of the portable non-volatile memory device and storing an encrypted password and encrypted bar code information, the operations authenticating the user of the portable non-volatile memory device in response to receiving the password and the bar code information from a scan of the bar code, ending a user session, saving changes to the user's personal computing environment to the computer, deactivating the first software product, and synchronizing the changes to the user's personal computing environment and user preferences to the portable non-volatile memory device.

12. An apparatus for providing a user-specific transportable computing environment, the apparatus comprising:
a portable non-volatile memory device configured to store information, the information comprising a software registry configured to identify software products licensed to a user and comprising a license key for each software product, and information to recreate the user's personal computing environment from the information stored on the portable non-volatile memory device, and user preferences associated with the software products licensed to the user; and
a computer configured to access the portable non-volatile memory device, recreate the user's personal computing environment, activate a first software product using a license key of the first software product from the software registry when the first software product is present on the computer and when the software registry stores the first software product license key else download and activate the first software product using the first software product license key when the first software product is not present on the computer and when the software registry stores the first software product license key, and synchronize only data files corresponding to the activated first software product.

13. The apparatus of claim 12, wherein the information further comprises authentication information.

14. The apparatus of claim 12, further comprising a biometric sensor.

15. The apparatus of claim 12, the portable non-volatile memory device comprising a barcode located on an exterior of the portable non-volatile memory device and storing an encrypted password and encrypted bar code information, the portable non-volatile memory device authenticating access to the portable non-volatile memory device in response to receiving the password and the bar code information from a scan of the bar code, the computer ending a user session, saving changes to the user's personal computing environment to the computer, deactivating the first software product, and synchronizing the changes to the user's personal computing environment and user preferences to the portable non-volatile memory device.

16. An apparatus for providing a user-specific transportable computing environment, the apparatus comprising:
a computing host configured to access a portable memory device comprising a software registry configured to identify software products licensed to a user and comprising a license key for each software product and the portable memory device further comprising information to recreate the user's personal computing environment from the information stored on the portable memory device;
the computing host further configured to recreate the user's personal computing environment, activate a first software product using a license key of the first software product from the software registry when the first software product is present on the computing host and when the software registry stores the first software product license key else download and activate the first software product using the first software product license key when the first software product is not present on the computing host and when the software registry stores the first software product license key, and
synchronize only data files corresponding to the activated first software product.

17. The apparatus of claim 16, wherein the computing host is further configured to deactivate the first software product licensed to the user.

18. The apparatus of claim 16, wherein the computing host is further configured to modify the first software product to match personal settings associated with the user.

19. The apparatus of claim 16, the portable memory device comprising a barcode located on an exterior of the portable memory device and storing an encrypted password and encrypted bar code information, the portable memory device authenticating access to the portable memory device in response to receiving the password and the bar code information from a scan of the bar code, the computing host ending a user session, saving changes to the user's personal computing environment to the computing host, deactivating the first software product, and synchronizing the changes to the user's personal computing environment and user preferences to the portable memory device.

* * * * *